United States Patent
Ubben et al.

(10) Patent No.: US 11,428,209 B2
(45) Date of Patent: Aug. 30, 2022

(54) SYSTEM AND METHOD FOR OPERATING A WIND FARM FOR FAST CONNECTION AFTER FARM SHUTDOWN

(71) Applicant: General Electric Company, Schenectady, NY (US)

(72) Inventors: Enno Ubben, Steinfurt (DE); Jorge Gonzalez Castro, Berlin (DE); Karthikeyan Appuraj, Bangalore (IN); Abhijeet Mazumdar, Bangalore (IN)

(73) Assignee: General Electric Company, Schenectady, NY (US)

( * ) Notice: Subject to any disclaimer, the term of this patent is extended or adjusted under 35 U.S.C. 154(b) by 73 days.

(21) Appl. No.: 16/631,005

(22) PCT Filed: Jul. 3, 2018

(86) PCT No.: PCT/US2018/040674
§ 371 (c)(1),
(2) Date: Jan. 14, 2020

(87) PCT Pub. No.: WO2019/014015
PCT Pub. Date: Jan. 17, 2019

(65) Prior Publication Data
US 2020/0224638 A1    Jul. 16, 2020

(30) Foreign Application Priority Data
Jul. 14, 2017 (IN) .............................. 201741024952

(51) Int. Cl.
*F03D 7/04* (2006.01)
*F03D 17/00* (2016.01)
*F03D 7/02* (2006.01)

(52) U.S. Cl.
CPC ............. *F03D 7/048* (2013.01); *F03D 7/026* (2013.01); *F03D 7/0264* (2013.01); *F03D 17/00* (2016.05); *F03D 7/0224* (2013.01)

(58) Field of Classification Search
CPC ........ F03D 7/048; F03D 7/026; F03D 7/0264; F03D 7/0224; F03D 17/00
See application file for complete search history.

(56) References Cited

U.S. PATENT DOCUMENTS

| 7,332,827 | B2 | 2/2008 | Nielsen |
| 8,664,788 | B1 * | 3/2014 | Wagoner ................. H02J 3/381 |
| | | | 290/55 |

(Continued)

FOREIGN PATENT DOCUMENTS

| EP | 2 902 621 A1 | 8/2015 |
| EP | 2609326 B1 | 6/2017 |
| WO | WO2017/000958 A1 | 1/2017 |

OTHER PUBLICATIONS

European Search Report, dated Oct. 14, 2020, for EP Application No. 18832544.3.

(Continued)

*Primary Examiner* — Courtney D Heinle
*Assistant Examiner* — Ryan C Clark
(74) *Attorney, Agent, or Firm* — Dority & Manning, P.A.

(57) ABSTRACT

A system and method for operating a wind farm connected to a power grid, the wind farm having one or more wind turbines includes implementing a shutdown mode for the one or more wind turbines of the wind farm in response to receiving a shutdown command. The shutdown mode includes disconnecting the one or more wind turbines of the wind farm from the power grid via one or more respective individual turbine controllers and reducing, via the individual turbine controllers, a rotor speed of the one or more wind turbines to a cut-in speed. After the shutdown com- (Continued)

mand is cleared, the method further includes reconnecting the one or more wind turbines to the power grid.

14 Claims, 6 Drawing Sheets

(56) References Cited

U.S. PATENT DOCUMENTS

| | | | |
|---|---|---|---|
| 9,062,653 B2 | 6/2015 | Brath | |
| 9,261,077 B2* | 2/2016 | Tirumalai | F03D 17/00 |
| 9,496,813 B2 | 11/2016 | Gupta et al. | |
| 9,574,548 B2 | 2/2017 | Doan | |
| 9,644,608 B2* | 5/2017 | Blom | F03D 7/0224 |
| 9,651,443 B2* | 5/2017 | Cardinal | G01M 1/22 |
| 9,745,957 B2 | 8/2017 | Seymour et al. | |
| 10,001,018 B2* | 6/2018 | Kvasnak | F23M 5/085 |
| 10,001,108 B2* | 6/2018 | Oing | F03D 7/0276 |
| 2007/0124025 A1 | 5/2007 | Schram et al. | |
| 2008/0277938 A1 | 11/2008 | Oohara et al. | |
| 2011/0293418 A1 | 12/2011 | Baba | |
| 2012/0010755 A1* | 1/2012 | Stapelfeldt | H02J 3/46 700/287 |
| 2014/0103653 A1* | 4/2014 | Ubben | F03D 7/028 290/44 |
| 2015/0155809 A1 | 6/2015 | Gupta et al. | |
| 2015/0252784 A1 | 9/2015 | Seymour et al. | |
| 2015/0330363 A1* | 11/2015 | Kruger | F03D 7/0284 290/44 |
| 2017/0145989 A1 | 5/2017 | Ritter et al. | |
| 2018/0156197 A1* | 6/2018 | Spruce | F03D 7/048 |
| 2019/0093632 A1* | 3/2019 | Zalar | F03D 7/0284 |

OTHER PUBLICATIONS

PCT International Search Report Corresponding to PCT/US2018/040674 dated Nov. 16, 2018.

* cited by examiner

SYSTEM AND METHOD FOR OPERATING A WIND FARM FOR FAST CONNECTION AFTER FARM SHUTDOWN

FIELD

The present disclosure relates generally to wind turbines, and more particular to a system and method for operating a wind farm in response to a shutdown command such that the wind farm can be quickly reconnected to the power grid after farm shutdown.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate member support frame located within the nacelle. More specifically, in many wind turbines, the gearbox is mounted to the bedplate member via one or more torque supports or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

A plurality of wind turbines are commonly used in conjunction with one another to generate electricity and are commonly referred to as a "wind farm." Typical wind farms include a farm-level controller communicatively coupled to individual turbine controllers of each of the wind turbines in the wind farm. As such, the farm-level controller provides an interface between the grid and each of the wind turbines. Thus, the farm-level controller communicates various commands to the turbine controllers.

For conventional wind farms, when the farm-level controller detects one or more constraints in the power grid, the farm-level controller is configured to send a shutdown command to each of the wind turbines in the wind farm. The individual turbine controllers then disconnect their respective wind turbine from the power grid and reduce the turbine speed to zero. When the shutdown command is released, the turbine controllers increase the turbine speed up to a cut-in speed and then reconnect the turbine back to the power grid.

At times, however, grid compliance may require the wind farm to reconnect to the power grid within a certain time period. Thus, a system and method for operating a wind farm in response to a shutdown command such that the wind farm can be quickly reconnected to the power grid after farm shutdown would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for operating a wind farm having one or more wind turbines connected to a power grid. The method includes implementing a shutdown mode for the one or more wind turbines of the wind farm in response to receiving a shutdown command. The shutdown mode includes disconnecting the one or more wind turbines of the wind farm from the power grid via one or more respective individual turbine controllers and reducing, via the individual turbine controllers, a rotor speed of the one or more wind turbines to a cut-in speed. After the shutdown command is cleared, the method further includes reconnecting the one or more wind turbines to the power grid.

In one embodiment, the method includes receiving, via the individual turbine controllers, the shutdown command from a farm-level controller of the wind farm. In another embodiment, the method may include receiving, via the individual turbine controllers, the shutdown command in response to one or more constraints in the power grid. In further embodiments, the method may include reconnecting the one or more wind turbines to the power grid in less than 90 seconds, more preferably less than 60 seconds.

In several embodiments, the method may include maintaining the rotor speed at the cut-in speed during the shutdown mode.

In additional embodiments, the method may also include increasing the cut-in speed of the one or more wind turbines to a rated speed after the shutdown command is cleared.

In yet another embodiment, the method may include monitoring at least one of the power grid or the one or more wind turbines for fault conditions, and in response to detecting one or more fault conditions, disconnecting the one or more wind turbines of the wind farm from the power grid via one or more respective individual turbine controllers and decreasing the rotor speed of the one or more wind turbines to zero.

In several embodiments, the method may include changing from a load operation mode to the shutdown mode in response to receiving a shutdown command. As used herein, the load operation mode may correspond to a partial load operation mode or a full load operation mode. In additional embodiments, the method also includes increasing at least one of a pitch rate of the wind turbine, a generator speed of the wind turbine, or a speed rate of the wind turbine such that the wind turbine follows a standard operating mode with a faster change between operational modes.

In another aspect, the present disclosure is directed to a wind farm connected to a power grid. The wind farm includes a plurality of wind turbines, each wind turbine comprising a turbine controller and a farm-level controller communicatively coupled to each of the turbine controllers. Each of the turbine controllers is configured to perform one or more operations, including but not limited to implementing a shutdown mode in response to receiving a shutdown command from the farm-level controller. More specifically, the shutdown mode includes disconnecting the wind turbine from the power grid and regulating a rotor speed of the wind turbine to a predetermined speed, the predetermined speed comprising rotor speeds greater than zero. After the shutdown command is cleared, the one or more operations may further include reconnecting the wind turbine to the power grid. It should also be understood that the wind farm may further include any of the additional features as described herein.

In yet another aspect, the present disclosure is directed to a method for operating a wind farm having one or more wind turbines connected to a power grid. The method includes disconnecting the one or more wind turbines of the wind farm from the power grid via one or more respective individual turbine controllers in response to receiving a shutdown command from a farm-level controller. Further, the method includes changing, via the individual turbine controllers, an operational mode of each of the one or more wind turbines from a load operation mode to a run-up cut-in mode. The method also includes determining a speed set point for the wind turbine as a function of a required grid reconnection time, the speed set point being greater than zero. In addition, the method includes operating, via the individual turbine controllers, the wind turbine at the speed set point during the non-power mode. After the shutdown command is cleared, the method also includes reconnecting the plurality of wind turbines to the power grid and increasing the speed set point to a rated speed set point. It should also be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
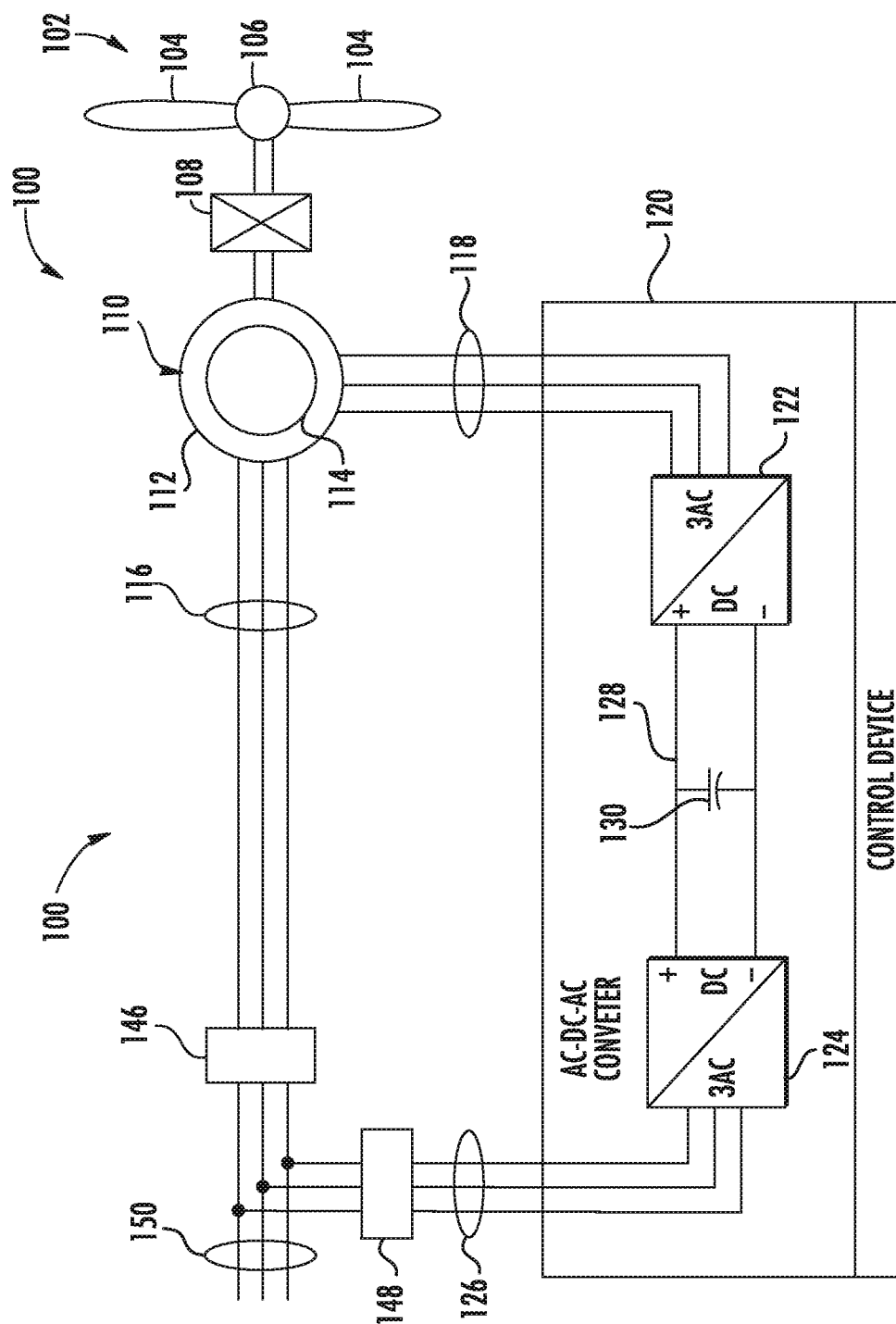
FIG. 1 illustrates one embodiment of an example wind turbine power system according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a schematic diagram of one embodiment of a wind turbine power system 100 according to the present disclosure. Example aspects of the present disclosure are discussed with reference to the wind turbine power system 100 of FIG. 1 for purposes of illustration and discussion. Those of ordinary skill in the art, using the disclosures provided herein, should understand that example aspects of the present disclosure are also applicable in other power systems, such as a wind, solar, gas turbine, or other suitable power generation system.

In the illustrated embodiment, the wind turbine power system 100 includes a rotor 102 includes a plurality of rotor blades 102 coupled to a rotatable hub 106, and together define a propeller. The propeller is coupled to an optional gearbox 108, which is, in turn, coupled to a generator 110. In accordance with aspects of the present disclosure, the generator 110 may be any suitable generator, including, but not limited to a doubly fed induction generator (DFIG) or a fully fed induction generator. Further, the generator 110 includes a stator 112 and a rotor 114. The stator 112 is typically coupled to a stator bus 116 and a power converter 120 via a rotor bus 118. The stator bus 116 provides an output multiphase power (e.g. three-phase power) from the stator 112 and the rotor bus 118 provides an output multi-phase power (e.g. three-phase power) of the rotor 114.

Referring to the power converter 120, the generator 110 is coupled via the rotor bus 118 to a rotor-side converter 122. The rotor-side converter 122 is coupled to a line-side converter 124 which in turn is coupled to a line-side bus 126. In example configurations, the rotor-side converter 122 and the line-side converter 124 are configured for normal operating mode in a three-phase, pulse width modulation (PWM) arrangement using insulated gate bipolar transistor (IGBT) switching elements. The rotor-side converter 122 and the line-side converter 124 can be coupled via a DC link 128 across which is the DC link capacitor 130.

Figure 2:
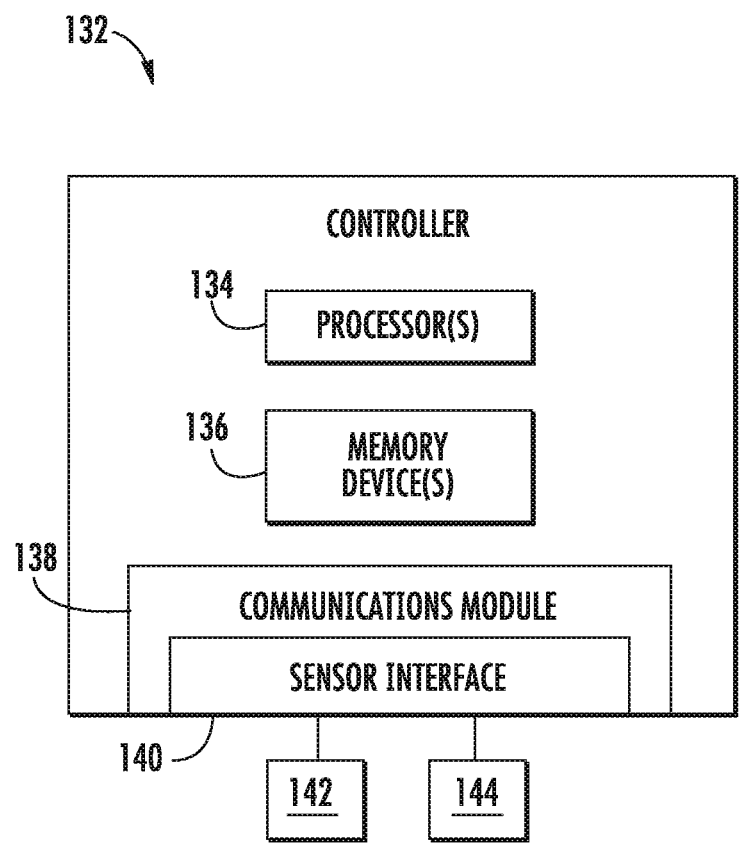
FIG. 2 illustrates a block diagram of one embodiment of a controller suitable for use with the wind turbine power system shown in FIG. 1.

The wind turbine power system 100 may also include a controller 132 configured to control the operation of the various components of the system 100 as well as implementing any method steps as described herein. Thus, the controller 132 can include any number of control devices. In one implementation, as shown in FIG. 2, the controller 132 can include one or more processor(s) 134 and associated memory device(s) 136 configured to perform a variety of computer-implemented functions and/or instructions (e.g., performing the methods, steps, calculations and the like and storing relevant data as disclosed herein). The instructions when executed by the processor 134 can cause the processor 134 to perform operations, including providing control commands to the various system components. Additionally, the controller 132 may include a communications module 138 to facilitate communications between the controller 132 and the various components of the power system 100, e.g. any of the components of FIG. 1. Further, the communications module 138 may include a sensor interface 140 (e.g., one or more analog-to-digital converters) to permit signals transmitted from one or more sensors to be converted into signals that can be understood and processed by the processors 176. It should be appreciated that the sensors (e.g. sensors 142, 144) may be communicatively coupled to the communications module 138 using any suitable means. For example, as shown, the sensors 142, 144 are coupled to the sensor interface 140 via a wired connection. However, in other embodiments, the sensors 142, 144 may be coupled to the sensor interface 140 via a wireless connection, such as by using any suitable wireless communications protocol known in the art. As such, the processor 134 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 134 is also configured to compute advanced control algorithms and communicate to a variety of Ethernet or serial-based protocols (Modbus, OPC, CAN, etc.). Additionally, the memory device(s) 178 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 136 may generally be configured to store suitable computer-readable instructions that, when implemented by the processor(s) 134, configure the controller 132 to perform the various functions as described herein.

During operation, alternating current (AC) power generated at the generator 110 by rotation of the rotor 102 is provided via a dual path to an electrical grid 150. The dual paths are defined by the stator bus 116 and the rotor bus 118. On the rotor bus side 118, sinusoidal multi-phase (e.g. three-phase) AC power is provided to the power converter 120. The rotor-side power converter 122 converts the AC power provided from the rotor bus 118 into direct current (DC) power and provides the DC power to the DC link 128. Switching elements (e.g. IGBTs) used in bridge circuits of the rotor side power converter 122 can be modulated to convert the AC power provided from the rotor bus 118 into DC power suitable for the DC link 128.

The line-side converter 124 converts the DC power on the DC link 128 into AC output power suitable for the electrical grid 150. In particular, switching elements (e.g. IGBTs) used in bridge circuits of the line-side power converter 124 can be modulated to convert the DC power on the DC link 128 into AC power on the line-side bus 126. The AC power from the power converter 120 can be combined with the power from the stator of the generator 110 to provide multi-phase power (e.g. three-phase power) having a frequency maintained substantially at the frequency of the electrical grid 150 (e.g. 50 Hz/60 Hz).

Various circuit breakers and switches, such as breakers 146, 148, can be included in the power system 100 to connect or disconnect corresponding buses, for example, when current flow is excessive and can damage components of the system 100 or for other operational considerations. Additional protection components can also be included in the power system 100.

Figure 3:
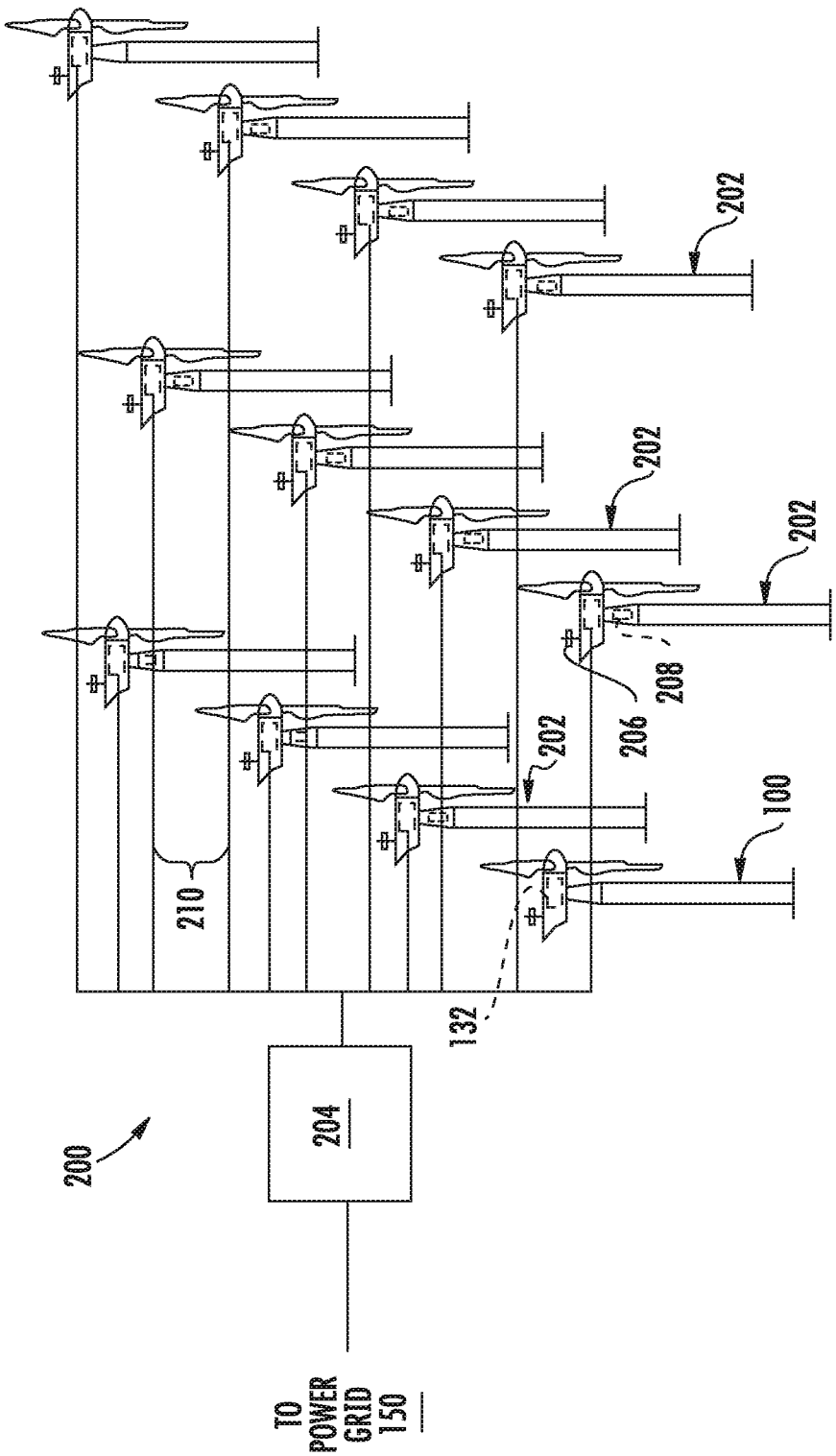
FIG. 3 illustrates a schematic view of one embodiment of a wind farm according to the present disclosure.

As mentioned, a plurality of wind turbines, such as the wind turbine power system 100 of FIG. 1, can be arranged together in a common geographic location and used in conjunction with one another to generate electricity. Such an arrangement is generally referred to as a wind farm. For example, as shown in FIG. 3, a wind farm 200 that is controlled according to the system and method of the present disclosure is illustrated. As shown, the wind farm 200 may include a plurality of wind turbines 202, including the wind turbine power system 100 described above, and a farm-level controller 204. For example, as shown in the illustrated embodiment, the wind farm 200 includes twelve wind turbines, including the wind turbine power system 100. However, in other embodiments, the wind farm 200 may include any other number of wind turbines, such as less than twelve wind turbines or greater than twelve wind turbines. In one embodiment, the controller 132 of the wind turbine power system 100 may be communicatively coupled to the farm-level controller 204 through a wired connection, such as by connecting the controller 132 through suitable communicative links 210 (e.g., a suitable cable). Alternatively, the controller 132 may be communicatively coupled to the farm-level controller 204 through a wireless connection, such as by using any suitable wireless communications protocol known in the art. In addition, the farm-level controller 204 may be generally configured similar to the controllers 132 for each of the individual wind turbines 202 within the wind farm 200.

In several embodiments, one or more of the wind turbines 202 in the wind farm 200 may include a plurality of sensors for monitoring various operating data points or control settings of the individual wind turbines 202 and/or one or more wind parameters of the wind farm 200. For example, as shown, each of the wind turbines 202 includes a wind sensor 206, such as an anemometer or any other suitable device, configured for measuring wind speeds or any other wind parameter. In addition, the wind turbine 202 may also include one or more additional sensors 208 for measured additional operating parameters of the wind turbines 202. For instance, the sensors 208 may be configured to monitor the turbine speed and/or electrical properties of the generator of each wind turbine 202. Alternatively, the sensors 208 may include any other sensors that may be utilized to monitor the power output of the wind turbines 202. It should also be understood that the wind turbines 202 in the wind farm 200 may include any other suitable sensor known in the art for measuring and/or monitoring wind parameters and/or wind turbine operating data.

Figure 4:
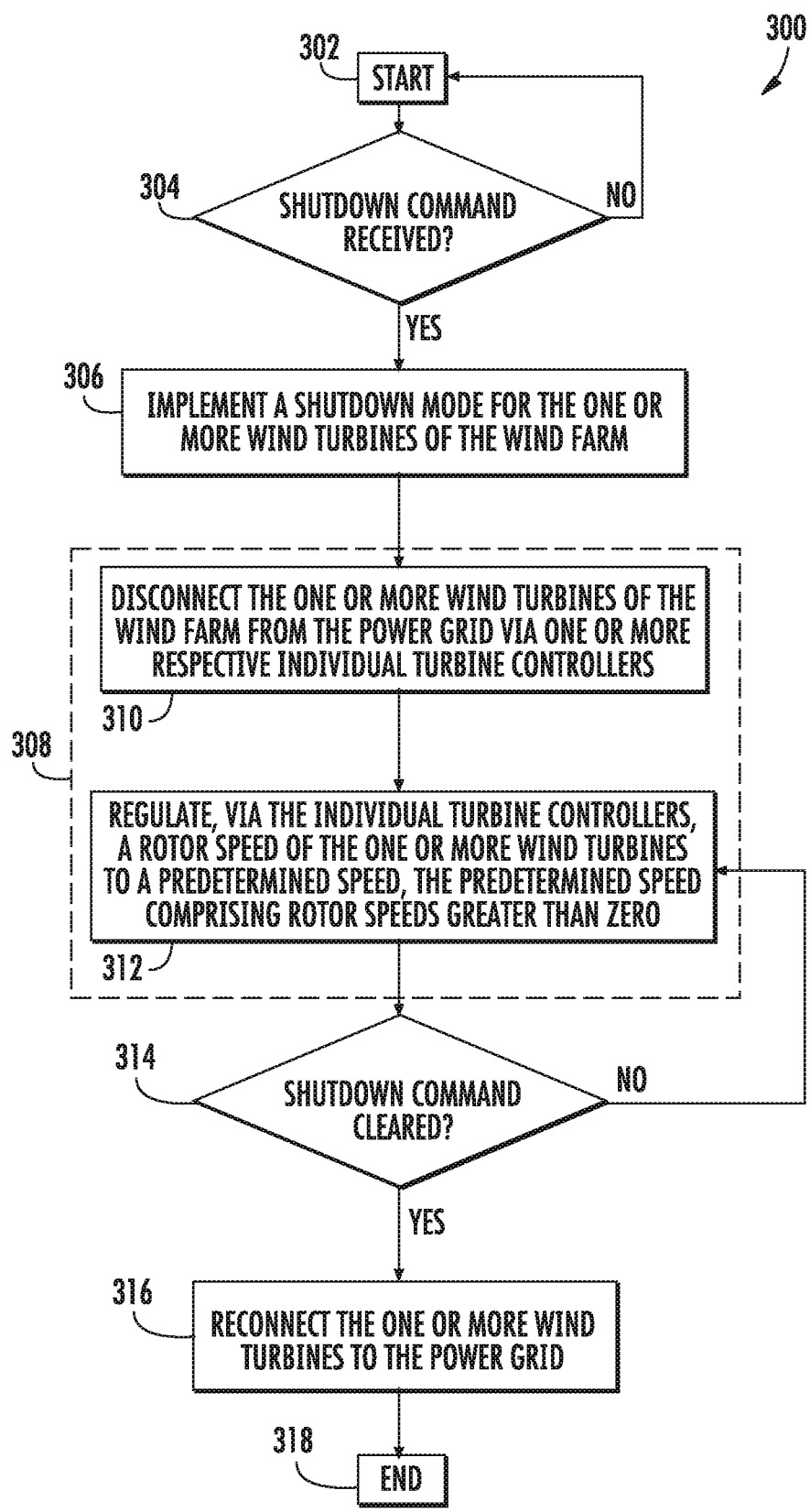
FIG. 4 illustrates a flow diagram of one embodiment of a method for operating a wind farm connected to the power grid according to the present disclosure.

Referring now to FIG. 4, a flow diagram of one embodiment of a method 300 for operating the wind farm 200 connected to the power grid 150 is illustrated. The method 330 begins at 302. As shown at 304, the turbine controllers 132 determine whether a shutdown command has been received, e.g. from the farm-level controller 204. For example, in several embodiments, the shutdown command may be generated by the farm-level controller 204 in response to one or more constraints in the power grid 150, electrical limitations of the wind turbines 202, and/or imbalances therebetween.

If the shutdown command is received, as shown at 306, the turbine controller(s) 132 is configured to implement a shutdown mode 308 for the wind turbine(s) 202 of the wind farm 200. For example, in one embodiment, the turbine controller(s) 132 may change from a load operation mode to the shutdown mode in response to receiving a shutdown command. As used herein, the load operation mode may correspond to a partial load operation mode or a full load operation mode. More specifically, as shown at 310 and 312, the shutdown mode 308 includes disconnecting the one or more wind turbines 202 of the wind farm 200 from the power grid 150 via one or more respective individual turbine controllers 132 and regulating (e.g. reducing) a rotor speed of the wind turbine(s) 202 to a predetermined speed via the respective individual turbine controllers 132. In additional embodiments, the turbine controller(s) 132 is configured to increase the pitch rate of one or more of the rotor blades 104 of the wind turbine, a generator speed of the wind turbine 100, and/or increase a speed rate of the wind turbine 100 such that the wind turbine follows a standard operating mode with a faster change between operational modes.

More specifically, the predetermined speed includes a range of rotor speeds greater than zero. For example, in one embodiment, the predetermined speed may correspond to a cut-in speed of the wind turbine(s) 202. In additional embodiments, the predetermined speed may be determined as a function of a required grid reconnection time. The required grid reconnection time may vary based on geographic location, however, it should be understood that the methods described herein may be capable of achieving fast reconnection times, such as less than 90 seconds, more preferably less than 60 seconds, and more preferably less than 30 seconds. In further embodiments, the turbine controllers 132 are also configured to maintain the rotor speed at the cut-in speed during the shutdown mode. As used herein, the cut-in speed generally refers to the rotor speed of the wind turbine 202 in which the turbine begins to generator power if the turbine is connected to the grid 150.

Referring still to FIG. 4, as shown at 314, the turbine controllers 132 continuously determine whether the shutdown command is cleared. For example, in one embodiment, the shutdown command includes a power command of zero. In other words, the farm-level controller 204 commands each of the wind turbines 202 to generate zero power. After the shutdown command is cleared, (i.e. the farm-level controller 204 increases the power command above zero), as shown at 316, the method 300 includes reconnecting the wind turbine(s) 202 to the power grid 150. Since the speed of each of the wind turbines 202 was maintained at the predetermined speed, however, the time for reconnection is substantially reduced. The method 300 ends at 318.

Figure 5:
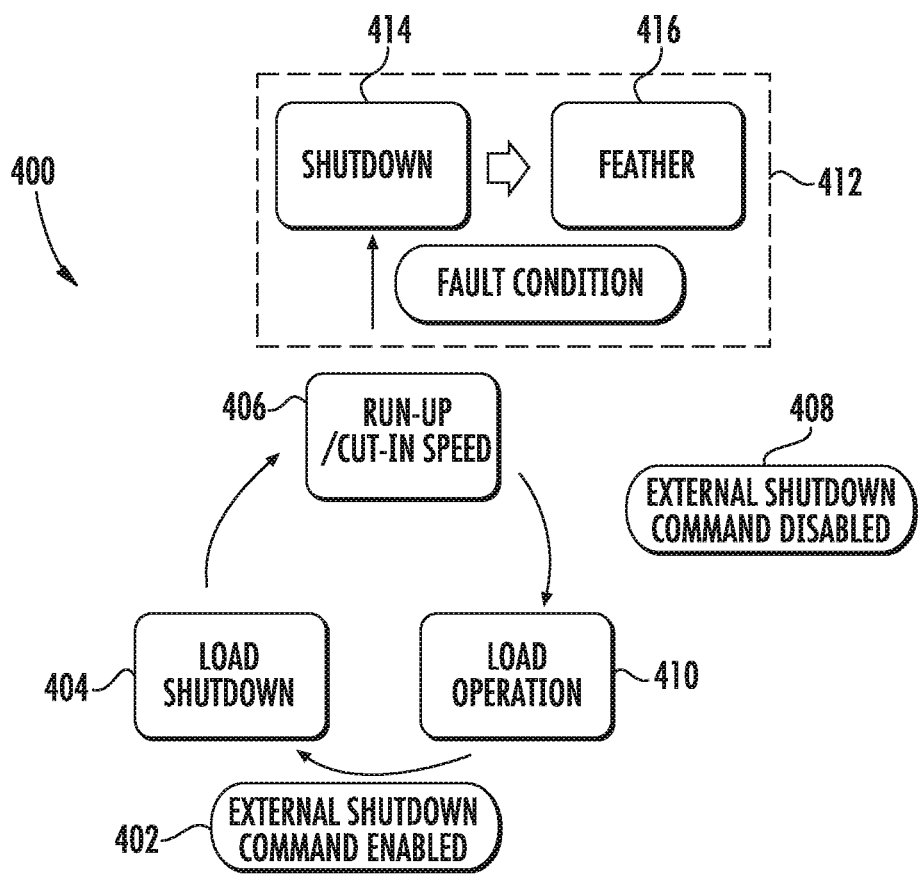
FIG. 5 illustrates a schematic diagram of one embodiment of a method for operating a wind farm connected to the power grid according to the present disclosure.

Referring now to FIG. 5, a schematic diagram 400 is provided to further illustrate details of the present disclosure. As shown, when the external shutdown command is enabled 402, the turbine load is shutdown 404 (i.e. the turbines 202 are disconnected from the power grid 150). However, in contrast to conventional control schemes, as shown at 406, the turbine controller(s) 132 maintain the rotor speed of the wind turbine(s) 202 at the run-up cut-in speed. At 408, the external shutdown command is disabled. At 410, the wind turbine(s) 202 are reconnected to the power grid 150 and normal load operation resumes. In certain instances, as shown in the outer loop 412, the turbine controller(s) 132 may fully shutdown 414 if a fault condition is detected. More specifically, as shown at 416, the rotor blades 104 of the wind turbines 202 may be pitched to feather to stop the turbines 202 from rotating.

In additional embodiments, the turbine controllers 132 are configured to increase the cut-in speed of the wind turbine(s) 202 to a rated speed after the shutdown command is cleared. As such, the methods described herein provide reduced reconnection time and begin to produce power more quickly than conventional methods.

In further embodiments, the controllers 132, 204 described herein may also monitor the power grid 150 and/or the wind turbine(s) 202 for fault conditions. Thus, if a fault is detected, the controllers 132, 204 may disconnect the wind turbine(s) 202 of the wind farm 200 from the power grid 150 and decrease the rotor speed of the wind turbine(s) 202 to zero (i.e. rather than maintaining the speed above zero).

Figure 6:
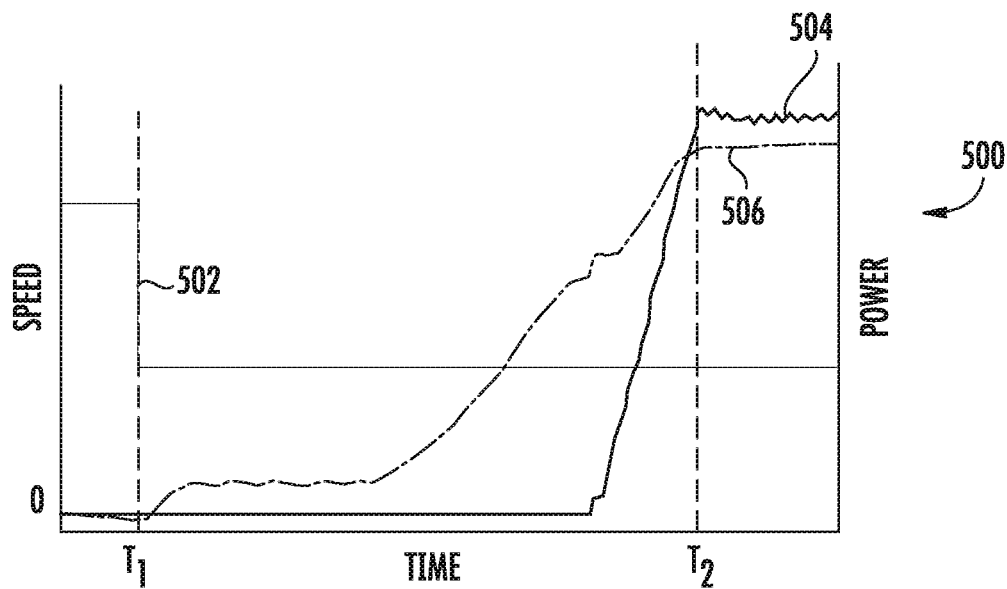
FIG. 6 illustrates a graph of speed and power (y-axis) versus time (x-axis) for conventional wind turbine power systems.
Figure 7:
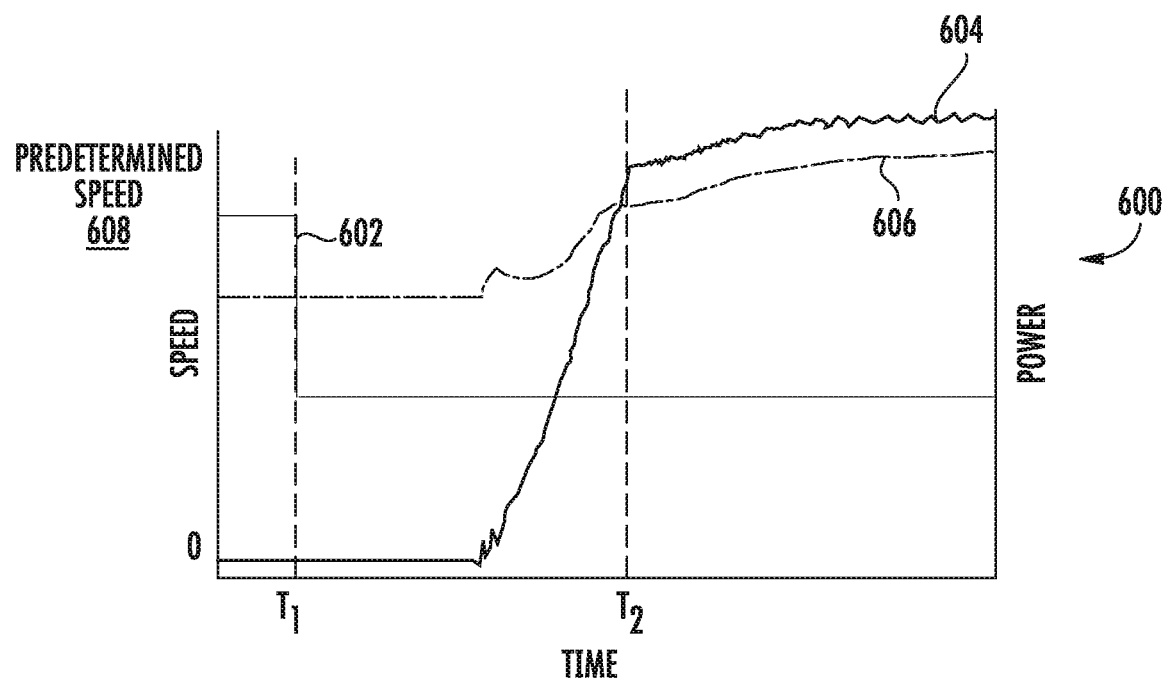
FIG. 7 illustrates a graph of one embodiment of speed and power (y-axis) versus time (x-axis) according to the present disclosure.

Benefits of the present disclosure can be further understood in reference to FIGS. 6-7. FIG. 6 illustrates a graph 500 of turbine speed 506 and power output 504 (y-axis) versus time (x-axis) for conventional wind turbine power systems. FIG. 7 illustrates a graph 600 of turbine speed 606 and power output 604 (y-axis) versus time (x-axis) according to the present disclosure. As shown at 502 and 602, the shutdown command is released. As shown in FIG. 6, for conventional systems that are completely shut down in response to the shutdown command, the turbine speed 506 starts at zero and is increased to rated speed. In contrast, as shown in FIG. 7, the turbine speed 606 starts from a predetermined speed 608 that is greater than zero (e.g. the cut-in speed). Therefore, the time (represented as $T_1$ and $T_2$) for the turbine speed 606 to reach rated speed is substantially decreased.

Exemplary embodiments of a wind turbine, a controller for a wind turbine, and methods of controlling a wind turbine are described above in detail. The methods, wind turbine, and controller are not limited to the specific embodiments described herein, but rather, components of the wind turbine and/or the controller and/or steps of the methods may be utilized independently and separately from other components and/or steps described herein. For example, the controller and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind farm connected to a power grid, the wind farm having a plurality of wind turbines controlled by a farm-level controller, the method comprising:
    receiving, via a plurality of individual turbine-level controllers, a shutdown command from the farm-level controller of the wind farm in response to one or more constraints in the power grid;
    in response to receiving the shutdown command from the farm-level controller, implementing a shutdown mode for each of the plurality of wind turbines of the wind farm via the plurality of respective individual turbine-level controllers, the shutdown mode comprising:
        disconnecting the plurality of wind turbines of the wind farm from the power grid via the plurality of respective individual turbine-level controllers;
        after disconnecting the plurality of wind turbines of the wind farm from the power grid, reducing, via the plurality of individual turbine-level controllers, a rotor speed of each of the plurality of wind turbines to a cut-in speed;
        maintaining, via the plurality of respective individual turbine-level controllers, the rotor speed of each of the plurality of wind turbines at the cut-in speed during the shutdown mode; and
        after the shutdown command is cleared from the farm-level controller, reconnecting the plurality of wind turbines to the power grid in less than 90 seconds.

2. The method of claim 1, further comprising increasing the cut-in speed of the plurality of wind turbines to a rated speed after the shutdown command is cleared.

3. The method of claim 1, further comprising:
monitoring at least one of the power grid or the plurality of wind turbines for fault conditions;
in response to detecting one or more fault conditions, disconnecting the plurality of wind turbines of the wind farm from the power grid via the plurality of respective individual turbine-level controllers and decreasing the rotor speed of the plurality of wind turbines to zero.

4. The method of claim 1, further comprising changing from a load operation mode to the shutdown mode in response to receiving the shutdown command.

5. The method of claim 4, wherein the load operation mode comprises at least one of a partial load operation mode or a full load operation mode.

6. The method of claim 1, further comprising increasing at least one of a pitch rate of one or more of the plurality of wind turbines, a generator speed of one or more of the plurality of wind turbines, or a speed rate of one or more of the plurality of wind turbines such that one or more of the plurality of wind turbines follows a standard operating mode with a faster change between operational modes.

7. A wind farm connected to a power grid, the wind farm comprising:
a plurality of wind turbines, each of the plurality of wind turbines comprising a turbine controller;
a farm-level controller communicatively coupled to each of the turbine controllers, each of the turbine controllers configured to perform a plurality of operations, the plurality of operations comprising:
receiving a shutdown command from the farm-level controller of the wind farm;
in response to receiving the shutdown command from the farm-level controller, implementing a shutdown mode for each of the plurality of wind turbines, the shutdown mode comprising:
disconnecting the plurality of wind turbines from the power grid; and,
after disconnecting the plurality of wind turbines of the wind farm from the power grid, reducing a rotor speed of each of the plurality of wind turbines to a cut-in speed;
maintaining the rotor speed of each of the plurality of wind turbines at the cut-in speed during the shutdown mode; and
after the shutdown command is cleared, reconnecting the plurality of wind turbines to the power grid in less than 90 seconds.

8. The wind farm of claim 7, wherein the farm-level controller sends the shutdown command to each of the turbine controllers in response to one or more constraints in the power grid.

9. The wind farm of claim 7, wherein the plurality of operations further comprise increasing the cut-in speed of the plurality of wind turbines to a rated speed after the shutdown command is cleared.

10. The wind farm of claim 7, wherein the farm-level controller is further configured to:
monitor at least one of the power grid or the plurality of wind turbines for fault conditions and,
in response to detecting one or more fault conditions, disconnect the plurality of wind turbines from the power grid via the turbine controllers and decreasing the rotor speed of the plurality of wind turbines to zero.

11. The wind farm of claim 7, wherein the plurality of operations further comprise changing from a load operation mode to the shutdown mode in response to receiving a shutdown command.

12. The wind farm of claim 11, wherein the load operation mode comprises at least one of a partial load operation mode or a full load operation mode.

13. A method for operating a wind farm connected to a power grid, the wind farm having a plurality of wind turbines controlled by a farm-level controller, the method comprising:
receiving, via a plurality of individual turbine-level controllers, a shutdown command from the farm-level controller of the wind farm;
in response to receiving the shutdown command from the farm-level controller, disconnecting the plurality of wind turbines of the wind farm from the power grid via the plurality of respective individual turbine-level controllers and changing, via the plurality of respective individual turbine-level controllers, an operational mode of each of the plurality of wind turbines from a load operation mode to a non-power mode;
determining a speed set point for the plurality of wind turbines as a function of a required grid reconnection time, the speed set point being greater than zero, the grid reconnection time being 90 seconds or less;
operating, via the plurality of respective individual turbine-level controllers, the plurality of wind turbines at the speed set point during the non-power mode; and
after the shutdown command is cleared, reconnecting the plurality of wind turbines to the power grid and increasing the speed set point of each of the plurality of wind turbines to a rated speed set point.

14. The method of claim 13, wherein the load operation mode comprises at least one of a partial load operation mode or a full load operation mode.

* * * * *